United States Patent [19]

Reher et al.

[11] Patent Number: 5,711,605
[45] Date of Patent: Jan. 27, 1998

[54] METHOD AND APPARATUS FOR PREDICTING BATTERY TEMPERATURE

[75] Inventors: Michael T. Reher, Grafton; Ronald L. Piontkowski, Brookfield; John J. Weier, Milwaukee; Bradley N. Koeppel, Watertown, all of Wis.

[73] Assignee: Globe-Union, Inc., Milwaukee, Wis.

[21] Appl. No.: 613,592

[22] Filed: Mar. 12, 1996

[51] Int. Cl.⁶ .............................. G01R 19/00; G01K 1/08
[52] U.S. Cl. ............................................. 374/141; 364/483
[58] Field of Search ................................ 374/141, 152; 364/557, 483

[56] References Cited

U.S. PATENT DOCUMENTS

| | | |
|---|---|---|
| 5,079,716 | 1/1992 | Lenhardt et al. ............... 364/483 |
| 5,321,627 | 6/1994 | Reher ............................. 364/483 |
| 5,349,535 | 9/1994 | Gupta ............................ 364/483 |

*Primary Examiner*—Richard Chilcot
*Assistant Examiner*—Paul D. Amrozowicz
*Attorney, Agent, or Firm*—Harness, Dickey & Pierce, P.L.C.

[57] ABSTRACT

A vehicle control unit estimates a temperature of the vehicle's battery including the temperature of each of the battery's plurality of cells. The control unit includes a memory unit having stored therein heat transfer coefficients of three types. The first type is representative of heat transfer between the cells of the battery; the second type is representative of heat transfer between the surrounding air and the middle cells of the battery; and the third type is representative of heat transfer between the surrounding air and the end cells of the battery. A microprocessor retrieves the heat transfer coefficients from the memory unit and determines individual cell temperatures of the battery based on the heat transfer coefficients, temperature of the ambient air, and the drive state of the vehicle.

24 Claims, 5 Drawing Sheets

METHOD AND APPARATUS FOR PREDICTING BATTERY TEMPERATURE

BACKGROUND OF THE INVENTION

1. Field of the Invention

The invention relates to a method for predicting battery temperatures, and more particularly to a method with which it is possible to estimate with a high degree of accuracy, the temperature of a battery. The method involves determining individual battery cell temperatures and an average battery temperature based on heat transfer coefficients which are dependent on and derivable from measured data such as ambient air temperatures, environmental/external factors, and battery cell temperatures.

2. Description of the Related Art

Until recently, the temperature of batteries had not really been considered in battery or vehicle designs. However, the increased emphasis on achieving tighter emission standards has resulted in hotter underhood temperatures and higher energy density batteries. As a result, variations in battery temperature have become much more pronounced.

It is well known that a battery's charging characteristics are dependent upon the temperature of the battery and, in particular, that there are optimal charging voltage levels associated with different battery temperatures. When the variations in battery temperature are large as in motor vehicles, the charging characteristics of the battery need to be adjusted accordingly. Some of the problems encountered when a battery is charged at voltages poorly suited for the battery temperature include shortened battery life, low charge levels, and, in some cases, battery damage.

To properly charge a battery, the voltage at which the battery is charged should be based upon the temperature of the battery. Additionally, when battery temperature is used as a guide for determining the charge voltage of a battery, a method or apparatus must be provided to supply a relatively accurate representation of the battery temperature.

In addition to the problem of determining an optimum voltage at which a battery should be charged for a given temperature, economic constraints have forced vehicle manufacturers to reduce the number of sensors used in a vehicle where possible. Thus, in some situations, a temperature sensor at the battery for providing actual battery temperature data will not be available. Accordingly, it would be advantageous if the temperature of a vehicle battery could be determined or estimated without requiring a separate temperature sensor at the battery. Further, it would be advantageous to use the data from a preexisting sensor in a vehicle to estimate the battery temperature.

One problem encountered when attempting to estimate battery temperatures based upon temperatures sensed at a temperature sensor disassociated with the battery, is that many modern automobiles have underhood temperatures which are extremely dynamic within a large temperature range. Factors which attribute to this dynamic behavior of modern automobiles are hotter running engines, low profile and aerodynamic front end styles, electric radiator fans and more compact underhood designs. For example, the temperature at a voltage regulator is a poor estimate of battery temperature since the voltage regulator has a lower thermal mass than the battery and will have a temperature which follows underhood temperatures much closer than that of the battery.

In U.S. Pat. No. 5,079,716 issued on Jan. 7, 1992 to the assignee of the instant application, a method and an apparatus for estimating the temperature of a vehicle battery is disclosed. In this method and apparatus, the estimated battery temperature is a function of a reference temperature which is sensed from one or more temperature sensors located apart from the battery and a group of coefficients which are based on empirical data. These coefficients are tailored for a specific vehicle, and are compiled by operating the vehicle to periodically sample and store the vehicle speed, the reference temperatures, the actual battery temperature, and the elapsed time between the samplings. Based upon the estimated battery temperature, a control unit controls the voltage at which the vehicle battery is charged. A limitation of this method and apparatus is that a plurality of temperature sensors are required to be arranged at different locations around the battery. Further, the accuracy of the temperature estimation is limited, because this method and the apparatus does not account for variations in temperatures of the individual cells of the battery and the coefficients are only applicable for the specific vehicle design.

A battery temperature prediction method which accounts for variations in the temperature changes of the individual cells in a battery and which does not require a plurality of temperature sensors arranged around the battery would represent a substantial advance in this art.

SUMMARY OF THE INVENTION

An object of the invention is to provide a method of predicting battery temperatures with a high degree of accuracy by estimating battery cell temperatures based on the air temperature, and heat transfer coefficients and multipliers determined from empirical data.

Another object of the invention is to provide a battery temperature predicting apparatus having a microprocessor unit for carrying out the above method for predicting battery temperatures.

The above objects are accomplished with an apparatus for predicting the temperature of a vehicle battery having a plurality of cells. The apparatus includes a memory unit having stored therein heat transfer coefficients of three types. The first type is representative of heat transfer between the cells of the battery; the second type is representative of heat transfer between the surrounding air and the middle cells of the battery; and the third type is representative of heat transfer between the surrounding air and the end cells of the battery. A microprocessor retrieves the heat transfer coefficients from the memory unit and determines individual cell temperatures of the battery based on the heat transfer coefficients, temperature of the ambient air, and external forces such as the drive state of the vehicle.

Additional objects and advantages of the invention will be set forth in the description which follows. The objects and advantages of the invention may be realized and obtained by means of the instrumentalities and combinations particularly pointed out in the appended claims.

BRIEF DESCRIPTION OF THE DRAWINGS

The invention is described in detail herein with reference to the drawings in which.

DETAILED DESCRIPTION OF THE PREFERRED EMBODIMENTS

Figure 1:
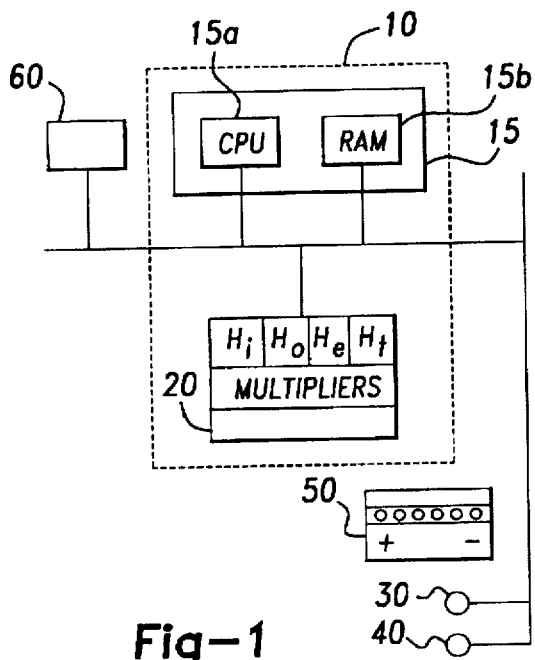
FIG. 1 is a schematic diagram showing the components of the battery temperature predicting apparatus according to the invention.

FIG. 1 is a schematic diagram showing the components of the battery temperature predicting apparatus according to the invention. The apparatus includes a vehicle control unit 10, a temperature sensor 30 and a drive state determining unit 40 which categorizes the external forces into a drive state among a preselected set. The selection may be manual or automatic and is based on a combination of various external factors, i.e. location of the battery in the engine compartment, the load on the engine, vehicle design, vehicle speed (city/highway driving), etc. The temperature sensor 30 generates an electrical signal in proportion to the temperature variations of the ambient air surrounding the vehicle battery which is indicated as 50 in FIG. 1, and transmits the electrical signal to the vehicle control unit 10. The drive state determining unit 40 generates an electrical signal corresponding to the drive state selection, and transmits the electrical signal to the vehicle control unit 10.

The vehicle control unit 10 includes a processing unit 15 having a central processor unit (CPU) 15a, a buffer memory 15b, and an internal clock (not shown). The vehicle control unit also includes a main memory unit 20. The main memory unit 20 is divided into a plurality of segments and has stored therein four types of heat coefficients, multipliers, and the current estimated cell temperatures of the vehicle battery, all of which will be described hereinafter. Preferably, the vehicle control unit 10 transmits the current cell temperatures, and an average value of the current cell temperatures to an external display device 60.

The four types of heat coefficients represent the following: cell to cell (Hi), air to mid-cell (Ho), air to end-cell (He), and cell to thermocouple (Ht). A multiplier is cross-referenced in the main memory unit 20 with the determined drive state.

The heat coefficients and the set of multipliers are derived using a third order model of the temperature variations of the vehicle battery 50 which assumes that the vehicle battery 50 is symmetrical, has six cells, two of which are end cells. This model breaks each cell into two masses, each mass has an infinite internal heat transfer rate. The first mass consists of a majority of the heat capacity and includes all six surfaces of the cell. The second mass consists of a negligible heat capacity and includes the thermocouple. This model accounts for the heat transfer between the air to cell, cell to cell, and cell to thermocouple.

The two end cells are treated differently than the mid-cells due to the additional heat capacity of the posts and additional surface area exposed to the air. The resulting equations consist of three parts:

1) The old cell temperature.
2) The additional heat passed to it from the air in the time span of Et.
3) The additional heat passed to it from neighboring cells in the time span Et.

The resulting equations, referenced as Equation Set (1), are:

$$c1t = lc1t + Et*(He*(Ta-lc1t) + Hi*(lc2t-lc1t))$$

$$c2t = lc2t + Et*(Ho*(Ta-lc2t) + Hi*(lc3t+lc1t-2*lc2t))$$

$$c3t = lc3t + Et*(Ho*(Ta-lc3t) + Hi*(lc4t+lc2t-2*lc3t))$$

$$c4t = lc4t + Et*(Ho*(Ta-lc4t) + Hi*(lc5t+lc3t-2*lc4t))$$

$$c5t = lc5t + Et*(Ho*(Ta-lc5t) + Hi*(lc6t+lc4t-2*lc5t))$$

$$c6t = lc6t + Et*(He*(Ta-lc6t) + Hi*(lc5t-lc6t))$$

where:

cXt=New cell X temperature
lcXt=Old cell X temperature
Hi=Intercell heat transfer coefficient (cell to cell)
Ho=Mid-cell heat transfer coefficient (air to middle cell)
He=End-cell heat transfer coefficient (air to end cell)
Et=Elapsed time between old and new
Ta=Air temperature After determining the individual cell temperatures, the thermocouple temperatures are then determined. The following equation, referenced as Equation Set (2), is used to accomplish this:

$$cXtt = lcXtt + Et*(Ht*(lcXt-lcXtt)$$

where:

cXtt=New cell X thermocouple temperature
lcXtt=Old cell X thermocouple temperature
Ht=Thermocouple heat transfer coefficient The internal heat transfer coefficient (Hi) and the thermocouple heat transfer coefficient (Ht) are empirically derived for a given battery design, while the end and mid cell heat transfer coefficients (Ho and He) are derived for a given battery system, (i.e. standard, shielded, insulated, etc.).

As discussed earlier, the different drive cycles and underhood designs are handled with a fifth variable, a multiplier. The end and mid cell heat transfer coefficients (Ho and He) are multiplied by a multiplier corresponding to each of the various drive states which account for the different heat transfer rates between the air and the battery, due to varying levels of forced convection. For example, if two drive modes are being studied, there will be one multiplier accounting for the increased heat transfer rate associated with a vehicle which is moving versus the heat transfer rate associated with a vehicle which is idle.

Figure 2:
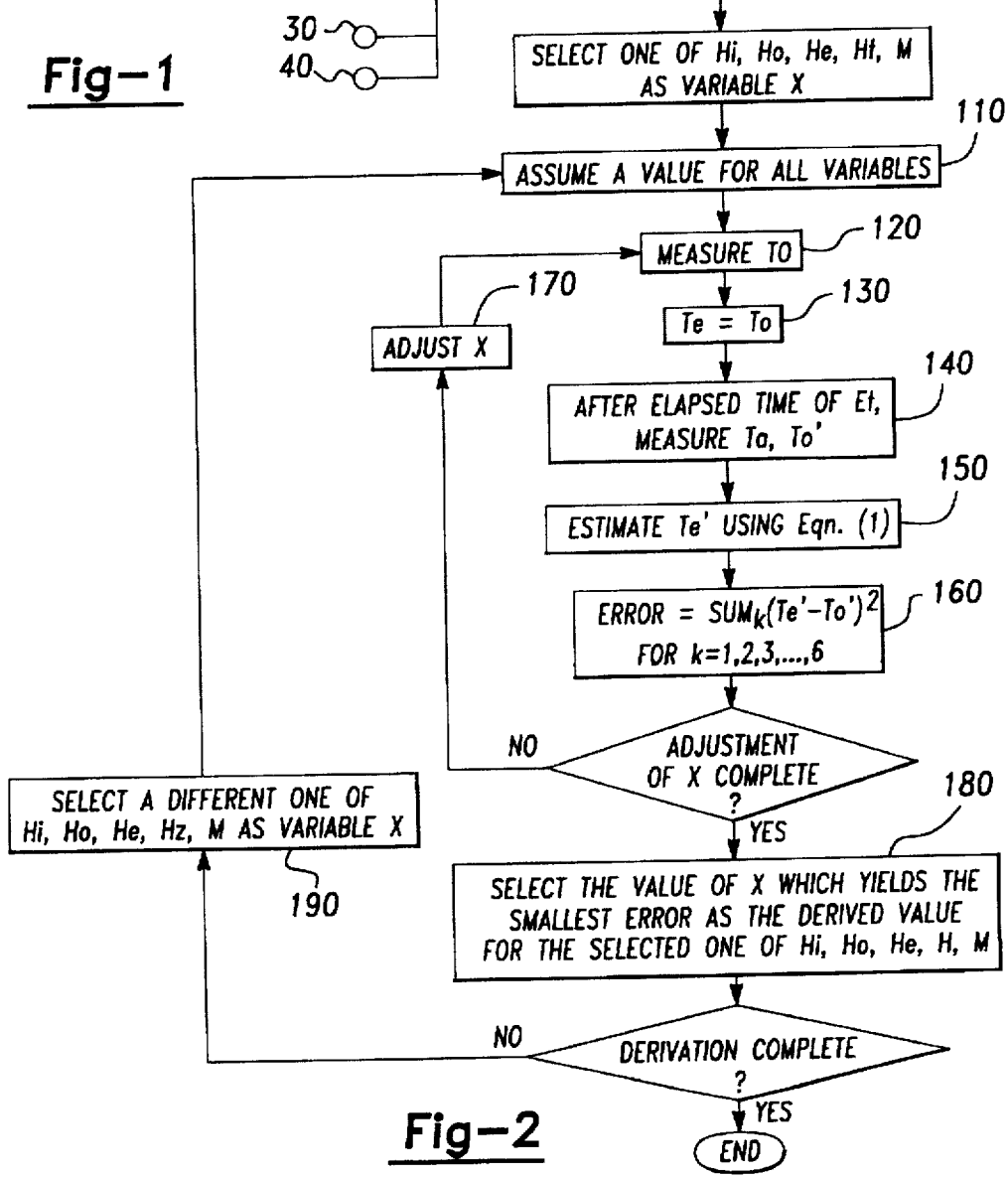
FIG. 2 is a flowchart showing the steps used to derive the coefficients used by the temperature predicting apparatus according to the invention.

FIG. 2 illustrates in a flowchart the procedure used to derive the heat transfer coefficients and the set of multipliers used by the temperature predicting apparatus according to the invention. Preferably, this procedure is fully automated using a programmed microprocessor. The heat transfer coefficients and multipliers are empirically derived based on test data which include individual cell temperatures, air temperature, drive state mode, and elapsed time.

The procedure for deriving the heat transfer coefficients essentially is initiated by assuming a set of values for He, Ho, Hi, Ht, and a multiplier, M (Step 110). Next, the actual cell temperatures (To) are measured (Step 120) and are used to initialize the estimated cell temperatures (Te) (Step 130). After an elapsed time of Et, the air temperature (Ta) is measured and the actual cell temperatures (To') are measured again (Step 140). A new set of estimated cell temperatures (Te') is then predicted using Equation Set (1), based on the assumed heat transfer coefficients and the multiplier, the air temperature (Ta), the elapsed time between samples (Et), and the previous set of estimated cell temperatures (Te) (Step 150). The difference between the actual cell temperatures (To') and the predicted cell temperatures (Te') is squared and summed to give the error (Step 160). Steps 110–160 are repeated for larger and smaller assumed values of one of He, Ho, Hi, Ht, and M (Step 170) and compared. The assumed value which yields the smallest squared sum is selected as the derived value (Step 180). Steps 110–180 are repeated for each one of He, Ho, Hi, Ht, and M (Step 190) until the squared sum of varied values no longer results in a smaller square sum than the assumed values.

Preferably, the above process should be conducted under several varying conditions for a given battery design. Since Ht and Hi are constant for a given battery design, the values for Ht and Hi determined under the different conditions can be averaged and used to determine the multiplier, Ho, and He.

The Ho and He heat transfer coefficients are constant for a given battery system, while the multipliers change in accordance with the drive states and underhood design. If more than one test is run for a given battery system, the Ho and He heat transfer coefficients can also be averaged to be representative of the given battery system.

Figure 3:
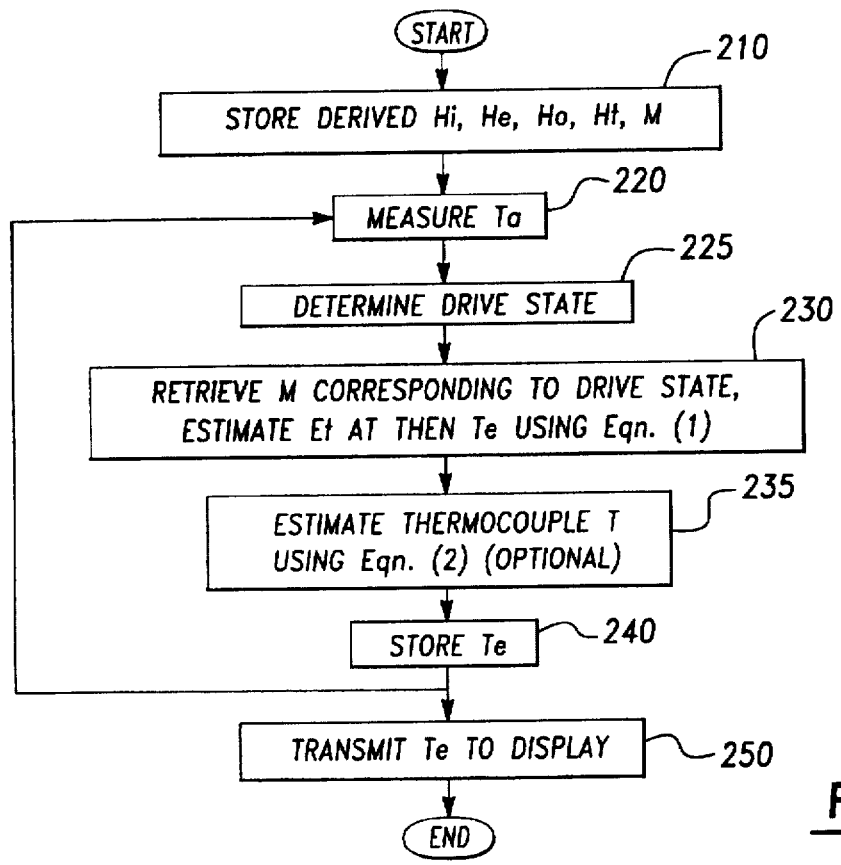
FIG. 3 is a flowchart showing the steps used in the method according to the invention for predicting a temperature of a vehicle battery.

Once the heat transfer coefficients and the set of multipliers are derived, individual cell temperatures of the vehicle battery can be predicted. FIG. 3 illustrates in a flowchart the method according to the invention for predicting a temperature of a vehicle battery. Initially, the derived heat transfer coefficients and the set of multipliers are stored in a memory unit (Step 210). Next, air temperature is measured (Step 220) and the drive state of the vehicle is determined (Step 225). Results of both are transmitted to the microprocessor. Upon receipt of the results, the microprocessor retrieves a multiplier corresponding to the drive state of the vehicle, estimates the time elapsed since the previous prediction, and estimates the cell temperatures using the Equation Set (1), in accordance with the air temperature, the elapsed time, the heat transfer coefficients, and the multiplier (Step 230). The results are stored in the memory (Step 240) and then transmitted to an external output device, e.g. display, printer, etc. (Step 250).

Optionally, a thermocouple temperature for each cell may be determined using Equation Set (2)in accordance with the previous thermocouple temperature, the thermocouple heat transfer coefficient and the elapsed time (Step 235).

Preferably, Steps 220–240 should be repeated at periodic intervals (Et) and the temperatures of the individual cells estimated at each Step 230. The estimated cell temperatures can then be stored in the main memory unit 20 of the vehicle control unit 10 for future use.

When the vehicle control unit 10 is first used, e.g. when the automobile carrying the battery 50 is started, the battery cell temperatures are initialized at Ta, the measured temperature of the air surrounding the battery 50. It is assumed here that the temperature of the battery cells has stabilized to be similar to the surrounding air temperature.

Alternatively, Equation (1) may be used to estimate the battery cell temperatures even when the automobile ignition is turned OFF. In this case, the drive state corresponding to the ignition OFF condition is selected and the multiplier corresponding to this selected drive state is retrieved.

EXAMPLE

The testing and analysis has been performed on a single vehicle battery design for various drive cycles and battery systems. Although the testing and analysis was done for only one particular design of a battery, the concepts learned from the testing and analysis are extendable to other battery designs. Testing was performed in an oven which was capable of simulating different drive cycles. The heat transfer coefficients were determined for all the tests and tabulated in Table 1 below.

TABLE 1

| Test | Ho | He | Mult | Hi | Ht |
|------|-----|-----|------|-----|-----|
| 1 | 0.121758 | 0.050202 | 1.656583 | 0.611579 | 3.519425 |
| 2 | 0.218910 | 0.312675 | 1.997228 | 1.388458 | 10.57351 |
| 3 | 0.122969 | 0.044463 | 1.806539 | 0.599377 | 3.478731 |
| 4 | 0.149044 | 0.113766 | 1.453556 | 1.086835 | 4.938784 |
| 5 | 0.174800 | 0.126425 | 1.241717 | 0.937135 | 5.177356 |
| 6 | 0.139922 | 0.058270 | 1.973104 | 0.613875 | 4.580811 |
| 7 | 0.176901 | 0.118985 | 1.203429 | 0.847707 | 5.628057 |
| 8 | 0.139317 | 0.057179 | 1.971985 | 0.670804 | 4.794604 |
| 9 | 0.177432 | 0.112907 | 1.198688 | 0.800432 | 5.878360 |
| 10 | 0.134474 | 0.057379 | 1.966351 | 0.706308 | 5.784538 |
| 11 | 0.091577 | 0.028129 | 2.981223 | 0.549929 | 5.769680 |
| 12 | 0.113550 | 0.058499 | 2.528181 | 0.628274 | 5.810697 |
| 13 | 0.093999 | 0.026036 | 2.934464 | 0.538899 | 5.733299 |
| 14 | 0.116486 | 0.057789 | 2.494781 | 0.632117 | 5.732442 |
| 15 | 0.084598 | 0.035900 | 2.990092 | 0.630980 | 5.717173 |
| 16 | 0.102294 | 0.077089 | 2.704202 | 0.892788 | 5.656331 |
| 17 | 0.087544 | 0.029489 | 2.979160 | 0.471795 | 5.845253 |
| 18 | 0.102313 | 0.080627 | 2.709575 | 0.909607 | 5.835834 |
| 19 | 0.076434 | 0.024461 | 4.225542 | 0.443850 | 1.859934 |
| 20 | 0.128719 | 0.138508 | 4.927267 | 1.074965 | 4.417836 |
| 21 | 0.091115 | 0.026192 | 4.156194 | 0.509022 | 3.285233 |
| 22 | 0.093162 | 0.057178 | 3.763456 | 0.796955 | 3.446325 |
| 23 | 0.090004 | 0.031996 | 4.009181 | 0.583559 | 3.282495 |
| 24 | 0.098367 | 0.081165 | 3.902000 | 0.950474 | 3.950310 |
| Avg | | | | 0.792 | 5.03 |

An average thermocouple heat transfer coefficient, Ht, was determined and then used in calculating an average internal heat transfer coefficient, Hi. The multiplier value was dependent upon which side of the oven the battery was located and whether the battery was on the oven grid or in a battery tray. The different locations within the oven represent slightly varying underhood designs. The tests were grouped together based upon which configuration was used during the test and average values for the multipliers were determined for each configuration.

Figure 4:
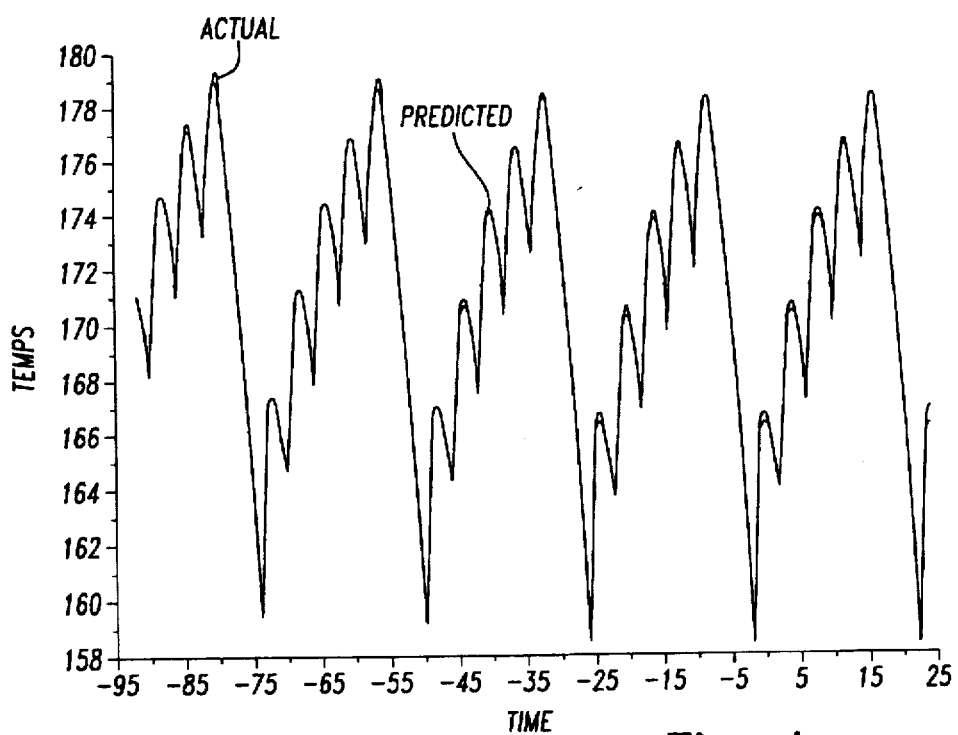
FIG. 4 is a graphical comparison of the predicted battery temperature with the actual battery temperature.
Figure 5:
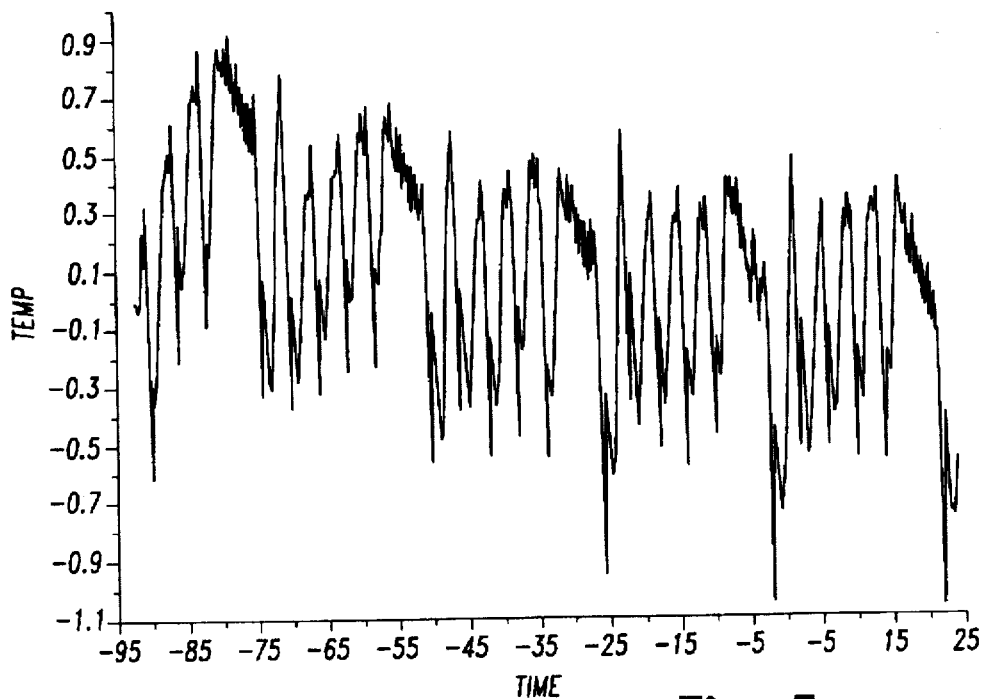
FIG. 5 is a graphical representation of the battery temperature prediction error.

The resulting heat transfer coefficients were then used to predict the average battery and individual battery cell temperatures using the actual oven ambient temperature as the air temperature. The resulting battery temperature prediction compared with the actual recorded battery temperature is shown in FIG. 4. The difference between the actual and predicted battery temperatures is graphed and shown in FIG. 5, which shows in detail the error associated in determining the heat transfer coefficients. As seen in this example, average battery temperature was on average within 1° F. of the actual recorded battery temperature. An improvement over the prediction error of 1° F. is not expected since this figure is also the approximate accuracy of the data acquisition equipment used during the tests.

The tool was expanded one step further to create an algorithm tool which would predict the oven temperature for various 24 hour cycles and allow for validation of the temperature predicting method according to the invention. The tool was designed to allow freedom in selecting four characteristics:

1) Number of cycles per day
2) Length of running period
3) Oven set-point temperature
4) Time between consecutive cycles The cool down rate was converted to equation form using empirical data to estimate oven temperatures and approximates the actual oven temperatures to within several degrees. A better method can be developed should it be deemed necessary, however, this simple algorithm is sufficient for validation purposes.

Figure 6:
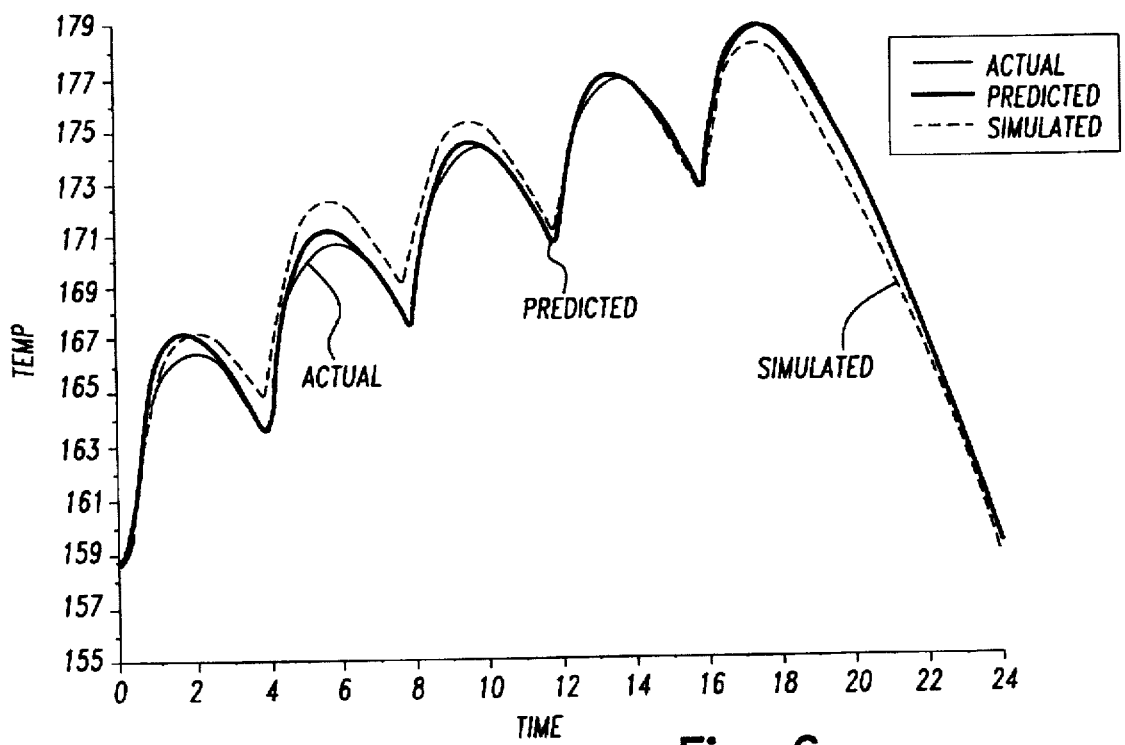
FIG. 6 is a graphical comparison of the actual battery temperatures (Actual), battery temperatures predicted from actual air temperature data (Predicted) and battery temperatures predicted from simulated air temperature data (Simulated).

The battery temperatures were then estimated using the calculated heat transfer coefficients and the predicted oven temperatures. The resulting battery temperature compared to the actual battery temperature and predicted battery temperature is shown in FIG. 6. In this graph, the actual battery temperature represents the average of the six individual measured cell temperatures, the predicted battery temperature represents the estimate of the battery temperature using the measured ambient air temperature and drive state, while the simulated battery temperature represents the estimate of the battery temperature using the estimated ambient air temperature and given drive cycle. Variations found in the simulated battery temperature are due to the combined errors in estimating the oven temperature and determining the appropriate heat transfer coefficients.

The magnitude of the battery temperature prediction errors associated with the estimate of the oven temperature and that associated with the estimate of the heat transfer coefficients and multipliers is shown graphically in FIG. 6. The "Actual" curve represents the measured battery temperature; the "Predicted" curve represents the predicted battery temperature based on the measured oven temperature; and the "Simulated" curve represents the predicted battery temperature based on the simulated oven temperature. The error associated with the estimate of the oven temperature, in this example, is approximately 0.5%.

With these tools, it was then possible to simulate and validate the temperature predicting method according to the invention in its entirety. FIGS. 7–10 show the validation results for Battery Systems 1 and 2. Battery system 1 represents a battery which is unmodified from the manufacturer whereas Battery System 2 represents a battery which is insulated with ⅛ inch thick foam insulation around all 4 sides and the bottom.

Figure 7:
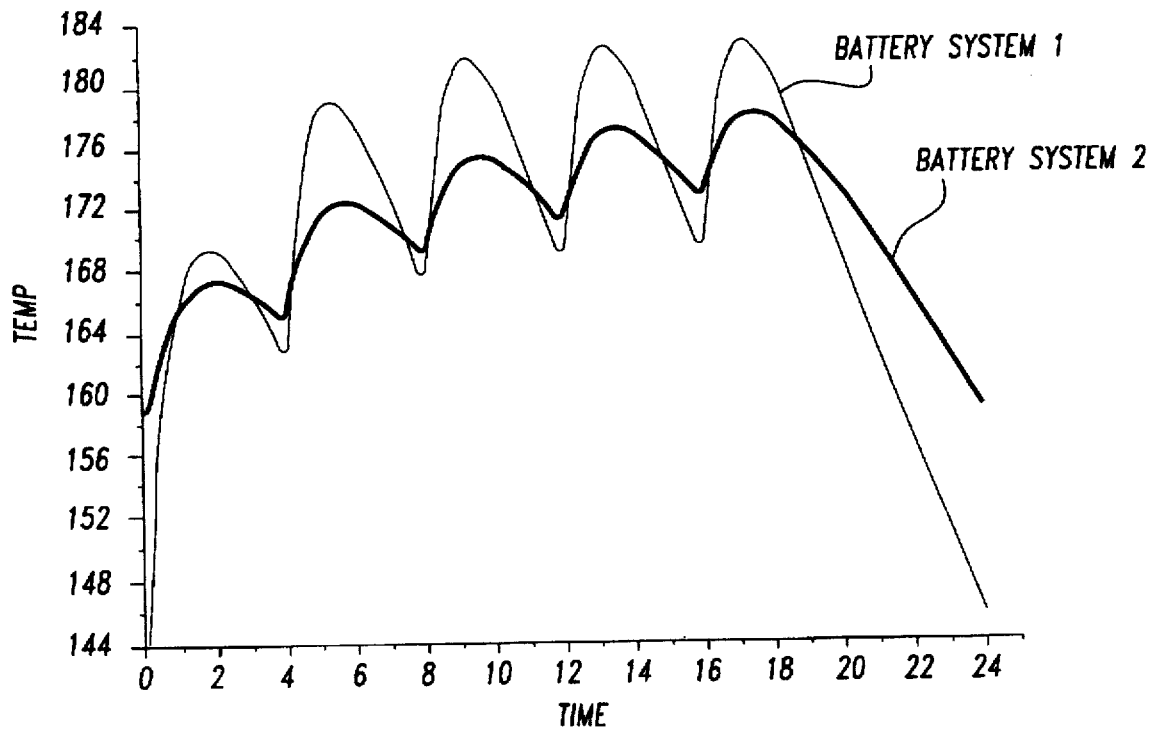
FIG. 7 is a graphical representation of battery temperature variations predicted for Battery Systems 1 and 2.
Figure 8:
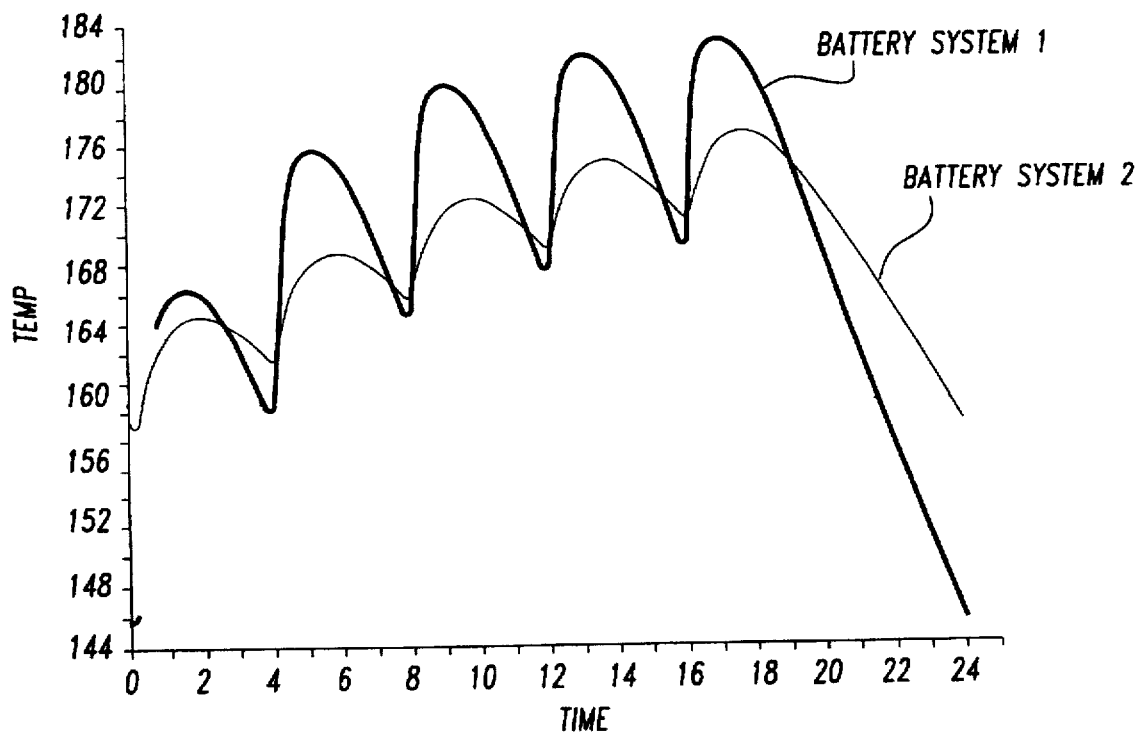
FIG. 8 is a graphical representation of actual battery temperature variations of Battery Systems 1 and 2 under the same conditions as in FIG. 7.

In the test corresponding to FIGS. 7 and 8, the oven was programmed to run at 222° F. for 20 minutes, every four hours, 5 times a day. The heat transfer coefficients were determined from the actual tests as described above. The simulation results are shown on FIG. 7 while the actual test data is shown on FIG. 8. As shown, the simulation estimated actual battery temperatures to within approximately 0.5%.

Figure 9:
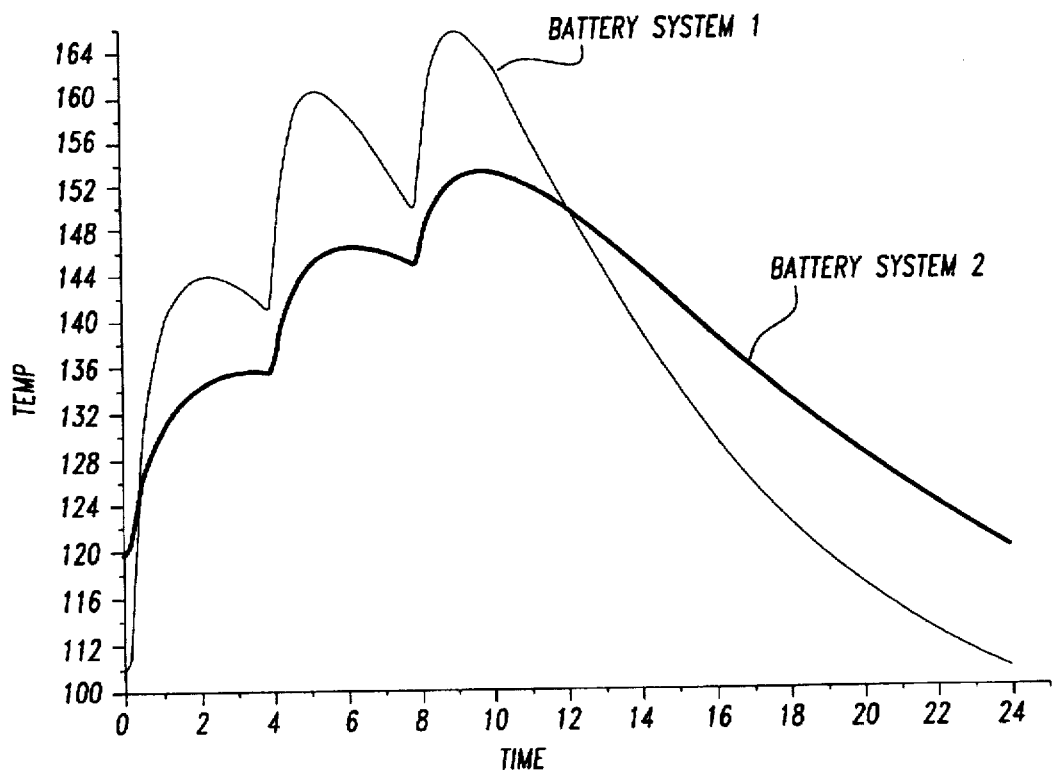
FIG. 9 is a graphical representation of battery temperature variations predicted for Battery Systems 1 and 2 under conditions different from that of FIG. 7.
Figure 10:
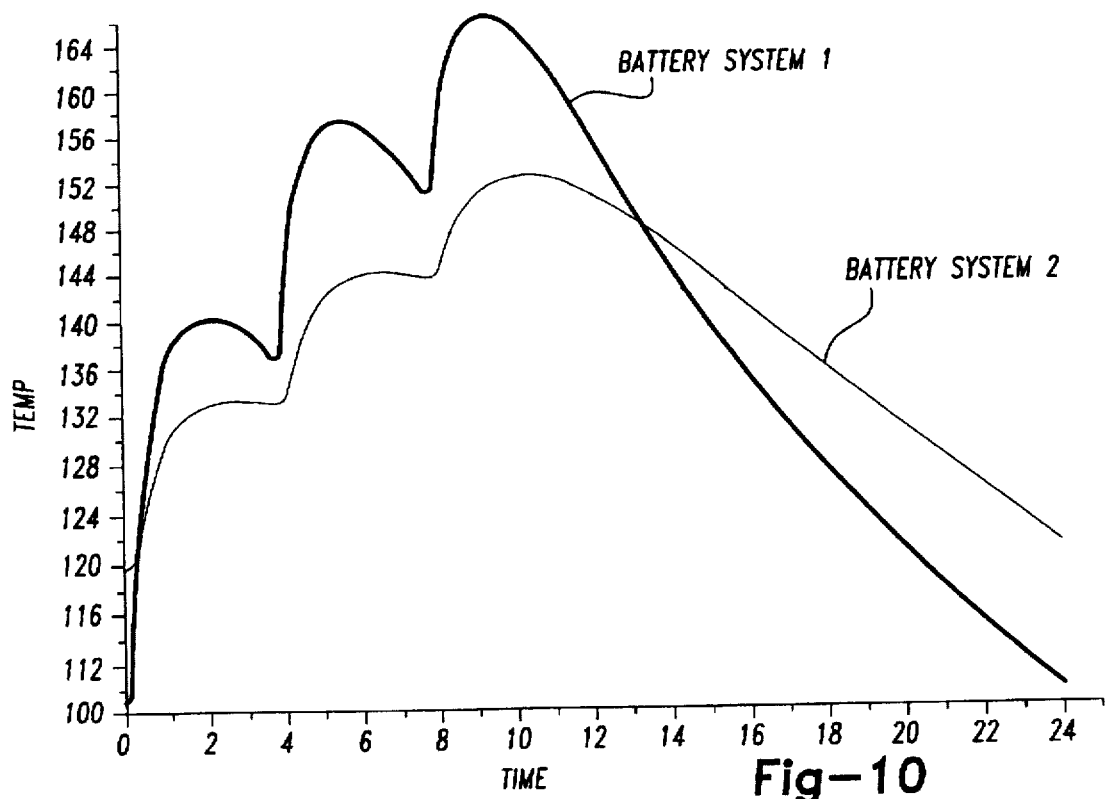
FIG. 10 is a graphical comparison of actual battery temperature variations of Battery Systems 1 and 2 under the same conditions as in FIG. 9.

FIGS. 9 and 10 correspond to a different test which was simulated using the same heat transfer coefficients as used above. This test was run at a lower temperature and with less cycles in order to increase battery life. In this simulation, the oven was programmed to run at 197° F. for 20 minutes, every four hours, 3 times a day. The simulation results are shown on FIG. 9, while the actual test results are shown on FIG. 10. In this case, the error is slightly higher, but not significantly higher. The variance found in this simulation are primarily a result from the error in estimating oven temperatures.

Oven test results have shown that battery temperature response is very sensitive to battery placement. This is due to the oven design, particularly how the heating element and circulation fan are placed. This problem is compounded, due to the relative size of the oven interior to the volume of the two batteries. A larger oven would allow for more uniform circulation of the air and more uniform heat distribution.

The temperature prediction tool is expandable in that more multipliers could be added to represent additional drive states. The underhood temperature prediction tool will require a similar expansion if simulation of varying drive cycles were required. This underhood temperature prediction tool expansion will require modeling the underhood environment for varying drive cycles and ambient conditions.

While a method for predicting battery temperatures for underhood vehicle batteries is proposed, it should be recognized that this method is applicable in predicting battery temperatures in marine, R.V., aircraft, UPS, etc. applications While particular embodiments according to the invention have been illustrated and described above, it will be clear that the invention can take a variety of forms and embodiments within the scope of the appended claims.

We claim:

1. A microprocessor-implemented method of predicting a temperature of a battery having a plurality of cells, said method comprising the steps of:
   (a) determining heat transfer coefficients for said battery, a first of said heat transfer coefficients being representative of heat transfer between the cells of said battery;
   (b) storing said heat transfer coefficients in a memory segment;
   (c) retrieving said heat transfer coefficients from said memory segment;
   (d) measuring the current air temperature surrounding the battery; and
   (e) approximating individual cell temperatures based on said current air temperature and heat transfer coefficients.

2. The method of claim 1, further comprising the steps of:
   (f) storing the approximated individual cell temperatures in another memory segment;
   (g) retrieving the approximated individual cell temperatures from said another memory segment; and
   (h) approximating another set of individual cell temperatures based on said heat transfer coefficients and said approximated individual cell temperatures.

3. The method of claim 1, wherein the steps of approximating individual cell temperatures further includes the step of estimating a temperature of said battery based on an average of said approximated individual cell temperatures.

4. The method of claim 1, wherein said plurality of cells include at least one middle cell and two end cells.

5. The method of claim 4, wherein a second of said heat transfer coefficients is representative of heat transfer between air surrounding said battery and a middle cell.

6. The method of claim 5, wherein a third of said heat transfer coefficients is representative of heat transfer between the air surrounding said battery and said end cells.

7. The method of claim 6, further comprising the steps of:
   (e) storing the approximated individual cell temperatures;

(f) retrieving the approximated individual cell temperatures; and (g) approximating another set of individual cell temperatures based on said heat transfer coefficients and said approximated individual cell temperatures.

8. The method of claim 1, wherein the steps of approximating individual cell temperatures further includes the step of estimating a temperature of said battery based on an average of said approximated individual cell temperatures.

9. The method of claim 1, wherein the step of determining also includes the step of determining a set of multipliers at least for one of said heat transfer coefficients, said multipliers corresponding to different external factors of said battery.

10. The method of claim 9, further comprising the step of selecting a multiplier among said set of multipliers in accordance with said external factors, and further wherein the step of approximating individual cell temperatures is also based on said multiplier.

11. A method of claim 10 wherein said battery is installed in a moveable vehicle.

12. A method of claim 11 wherein said external factors include a drive state of said vehicle.

13. A method of claim 10 wherein said battery is located in a stationary housing.

14. A method, implemented in a control unit, of predicting a temperature of a battery having a plurality of cells, said method comprising the steps of:

(a) providing, in a storage device of said control unit, (i) heat transfer coefficients for said battery, a first of said heat transfer coefficients being representative of heat transfer between the cells of said battery, and (ii) a set of multipliers for at least one of said heat transfer coefficients, said multipliers corresponding to different external factors of said battery;

(b) measuring a current air temperature;

(c) selecting a multiplier among said set of multipliers in accordance with said external factors;

(d) approximating a set of individual cell temperatures based on said heat transfer coefficients, said current air temperature, and said multiplier; and (e) estimating the temperature of said battery based on said individual cell temperatures.

15. The method of claim 14, wherein said plurality of cells include at least one middle cell and two end cells.

16. The method of claim 15, wherein a second of said heat transfer coefficients is representative of heat transfer between air surrounding said battery and a middle cell and a third of said heat transfer coefficients is representative of heat transfer between the air surrounding said battery and said end cells.

17. The method of claim 14 wherein said battery is located in a moveable vehicle and said external factors include operating characteristics of the vehicle.

18. The method of claim 16 wherein said battery is located in a stationary housing.

19. The method of claim 14 wherein the step of estimating the temperature of the battery is based on an average of said individual cell temperatures.

20. A vehicle control unit which predicts a temperature of a battery of a vehicle having a plurality of cells comprising:

a temperature sensor for sensing the temperature of the air surrounding the battery and producing an air temperature signal related thereto;

a memory unit having stored therein heat transfer coefficients, a first of said heat transfer coefficients being representative of heat transfer between the cells of said battery; and a processor which retrieves said heat transfer coefficients from said memory unit and determines individual cell temperatures of said battery based on said heat transfer coefficients and said air temperature signal.

21. The vehicle control unit of claim 20, wherein said processor determines a temperature of said vehicle battery based on an average of said individual cell temperatures.

22. The vehicle control unit of claim 21, wherein:

said plurality of cells include at least one middle cell and two end cells, a second of said heat transfer coefficients is representative of heat transfer between air surrounding said vehicle battery and a middle cell, and a third of said heat transfer coefficients is representative of heat transfer between the air surrounding said vehicle battery and said end cells.

23. The vehicle control unit of claim 22, further comprising a drive state sensor which determines a current drive state of said vehicle, and further wherein said processor determines a temperature of said vehicle battery based also on said current drive state.

24. The vehicle control unit of claim 23, wherein said memory unit also has stored therein a set of multipliers for at least one of said heat transfer coefficients, said multipliers being related to different drive states of said vehicle, and wherein said processor determines a temperature of said individual cell temperatures based on said heat transfer coefficients, said temperature signal, and a multiplier among said set of multipliers which corresponds to said current drive state.

* * * * *